United States Patent [19]
Sakurai

[11] Patent Number: 5,146,374
[45] Date of Patent: Sep. 8, 1992

[54] METHOD AND APPARATUS FOR DETERMINING TRACK POSITION OF A HEAD ON A RECORDING MEDIUM

[75] Inventor: Tetsuji Sakurai, Oome, Japan

[73] Assignee: Kabushiki Kaisha Toshiba, Kawasaki, Japan

[21] Appl. No.: 337,100

[22] Filed: Apr. 12, 1989

[30] Foreign Application Priority Data

Apr. 12, 1988 [JP] Japan .................................. 63-90072

[51] Int. Cl.[5] .......................... G11B 5/55; G11B 21/08
[52] U.S. Cl. ............................... 360/78.14; 360/78.04; 369/32
[58] Field of Search ............. 369/32, 33, 44.28, 44.32, 369/41; 360/49, 78.01, 78.04, 78.14, 77.01, 77.02; 358/907

[56] References Cited

U.S. PATENT DOCUMENTS

| | | | |
|---|---|---|---|
| 3,838,457 | 9/1974 | Palmer | 360/78.04 |
| 4,499,511 | 2/1985 | Sugaya | 360/78.14 |
| 4,631,606 | 12/1986 | Sugaya | 360/78.14 |
| 4,736,352 | 4/1988 | Satoh et al. | 369/32 |
| 4,774,699 | 9/1988 | Giddings | 369/32 |
| 4,847,708 | 7/1989 | Furuyama | 369/32 |

FOREIGN PATENT DOCUMENTS 58-146058 8/1983 Japan .
58-218079 12/1983 Japan .
59-165279 9/1984 Japan .

Primary Examiner—Aristotelis Psitos
Assistant Examiner—Steven R. Garland
Attorney, Agent, or Firm—Oblon, Spivak, McClelland, Maier & Neustadt

[57] ABSTRACT

An access controller for a recording medium, said recording medium including a plurality of track blocks, each of which includes a plurality of tracks, including a generating section including a head, for reading out servo patterns recorded on the recording medium, and for generating servo data from the readout servo patterns, the servo patterns being associated with the tracks, a storage section for storing previous position data and movement amount data, the previous block-in position data representing a previous track position of said head in a current track block of the track blocks, and the movement amount data representing a number of tracks between the previous track position and a track position previous to the previous track position, and a determination section for selectively determining in accordance with the servo data current block-in position data from at least one of the servo data generated by the generating section and the previous block-in position data and the movement amount data stored in the storage section.

18 Claims, 3 Drawing Sheets

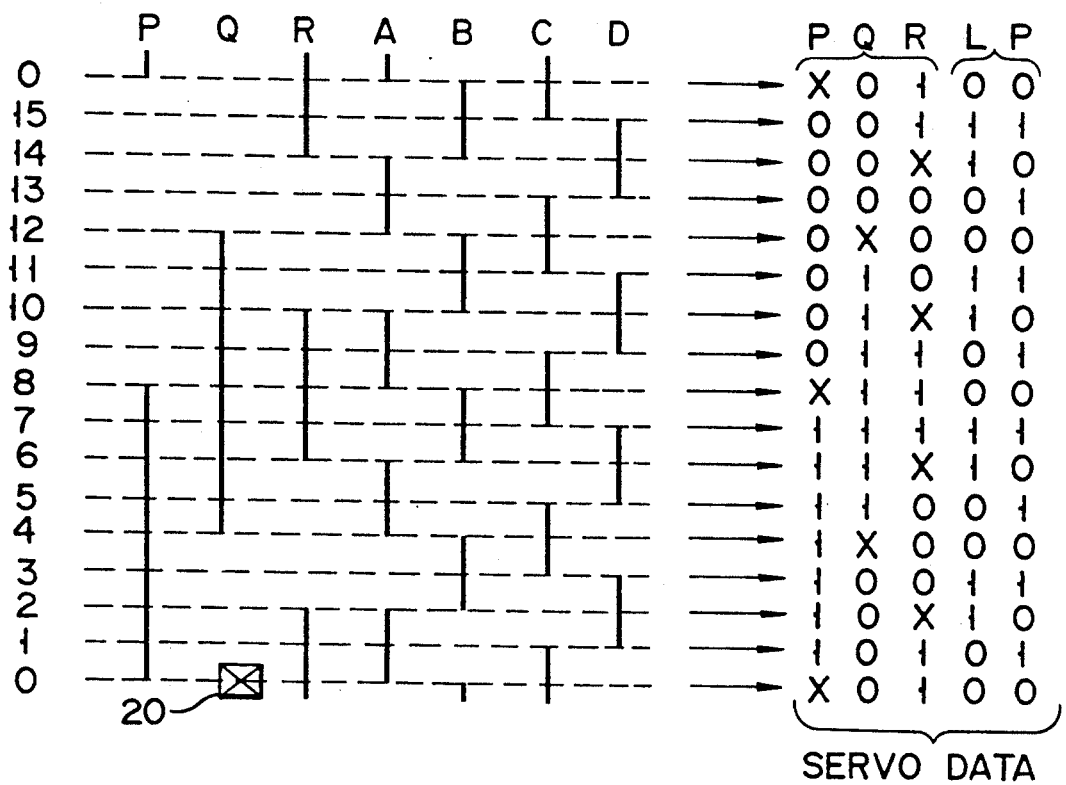
FIG. 1A (PRIOR ART)
FIG. 1B (PRIOR ART)
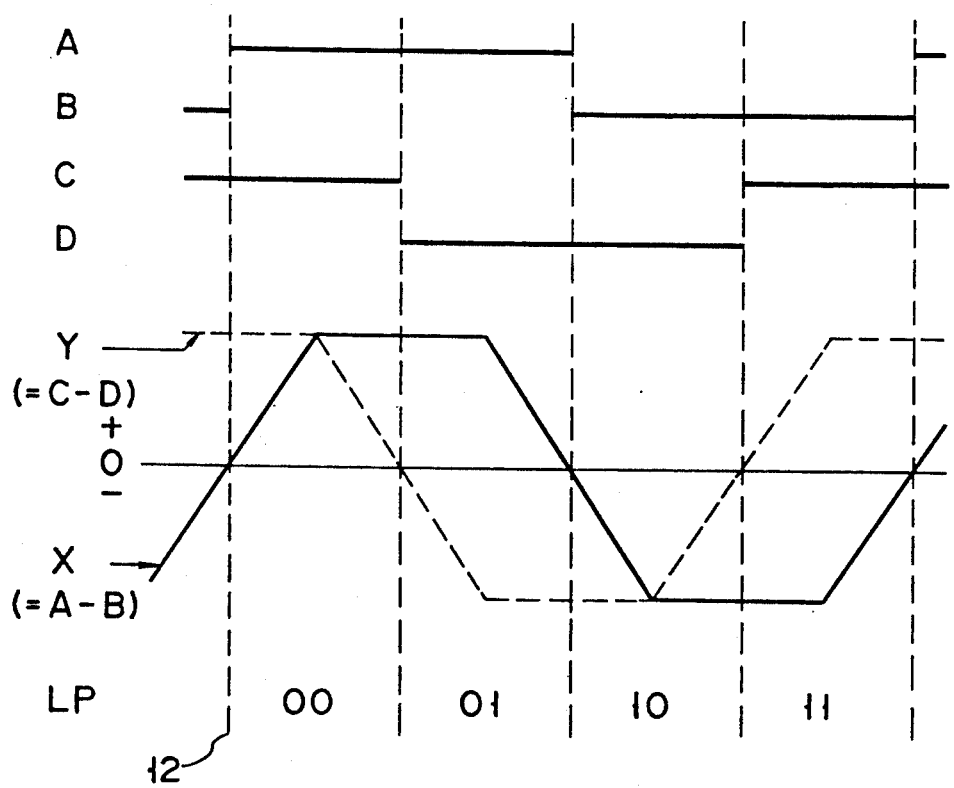
FIG. 1C (PRIOR ART)

METHOD AND APPARATUS FOR DETERMINING TRACK POSITION OF A HEAD ON A RECORDING MEDIUM

BACKGROUND OF THE INVENTION

1. Field of the Invention

The present invention relates to a sector servo system access controller.

2. Related Art of the Invention

As an access controller for, e.g., a magnetic disk apparatus, a sector servo system access controller is well known. In the case of this system, a magnetic head is positioned on a destination track on the basis of servo data recorded in advance in a servo area on a data surface of a magnetic disk serving as a recording medium. In the servo area, servo data consisting of servo patterns shown in FIG. 1A is recorded for each track block of, for example, 16 tracks.

In FIG. 1A, each dotted line represents the center of a corresponding one of tracks 0 to 15 in each block. As shown in FIG. 1B, for example, servo data corresponding to servo patterns is 5-bit data having bits P, Q, R, L, and P. The bit data "1", "0", and "X" of bits P, Q and R represent "presence", "absence", and "indeterminate state", respectively. The bits LP are bits of a 4-track period determined on the basis of servo patterns A, B, C, and D. Therefore, as shown in FIGS. 1A and 1B, when a head 20 is present on the track 0, servo data "X0100" is obtained.

In a conventional access controller, a peak value of each of the servo patterns A to D is held in correspondence with a track center wherein the magnetic head is positioned, as shown in FIG. 1C. Thereafter, peak value differences "$X=A-B$" and "$Y=C-D$" are calculated, the bits LP of the 4-track period being determined in accordance therewith. More specifically, if "$X \geq 0$, and $Y>0$", the bits LP are "00"; if "$X>0$, and $Y \leq 0$", they are "01"; if "$X \leq 0$, and $Y<0$", they are "10"; and if "$X<0$, and $Y \geq 0$", they are "11". As a result, the whole servo data is obtained from the bits P, Q, R, and LP.

In the conventional access controller, the track position of a head in a track block is determined in accordance with servo data of 5 bits, i.e., the bits P, Q, R, and LP. Therefore, the head position on a recording medium can be determined in accordance with data representing a block-in track position and data representing a track block position. For example, when the servo data is "01100", it is determined that the head is positioned on the track 8 of the track block. However, due to an influence of disturbance on the controller, a defect of the recording medium, or the like, there is a case that incorrect servo data such as "00011" is generated. Conventionally, in such a case, the current track position of the head cannot be determined, and thus the head position cannot be controlled.

SUMMARY OF THE INVENTION

It is an object of the present invention to provide a method of estimating the current track position of a head even if servo data read out by the head is incorrect, and an access controller therefor.

In order to achieve the object, an access controller for a recording medium, said recording medium including a plurality of track blocks, each of which includes a plurality of tracks, comprises a generating section including a head, for reading out servo patterns recorded on the recording medium, and for generating servo data from the readout servo patterns, the servo patterns being associated with the tracks, a storage section for storing previous position data and movement amount data, the previous block-in position data representing a previous track position of said head in a current track block of the track blocks, and the movement amount data representing a number of tracks between the previous track position and a track position previous to the previous track position, and a determination section for selectively determining in accordance with the servo data current block-in position data from at least one of the servo data generated by the generating section and the previous block-in position data and the movement amount data stored in the storage section.

In order to achieve another object, a method of determining a position of a head on a recording medium, the recording medium including a plurality of track blocks, each of which includes a plurality of tracks, comprises, generating servo data from the servo patterns recorded on the recording medium, the servo patterns being associated with said tracks, and selectively determining in accordance with the servo data current block-in position data from at least one of the servo data and the previous block-in position data and the movement amount data, the previous block-in position data representing a previous track position of said head in a current track block of the track blocks, and the movement amount data representing a number of tracks between the previous track position and a track position previous to the previous track position.

As described above, according to an access controller of the present invention, the current track position of the head can be estimated even if incorrect servo data is generated due to a disturbance or the like, and the head positioned on the desired destination track on the basis of the estimated current track position.

BRIEF DESCRIPTION OF THE DRAWINGS

FIG. 1A shows servo patterns recorded on a recording medium;

FIG. 1B shows servo data corresponding to the servo patterns of FIG. 1A;

FIG. 1C shows a method of obtaining the servo data of FIG. 1B from the servo patterns of FIG. 1A;

DETAILED DESCRIPTION OF THE PREFERRED EMBODIMENTS

An access controller according to an embodiment of the present invention, taking a magnetic disk apparatus for instance, will be described in detail hereinafter, with reference to the accompanying drawings, but first a general arrangement of the access controller according to the embodiment will be described, with reference to FIG. 2.

Figure 2:
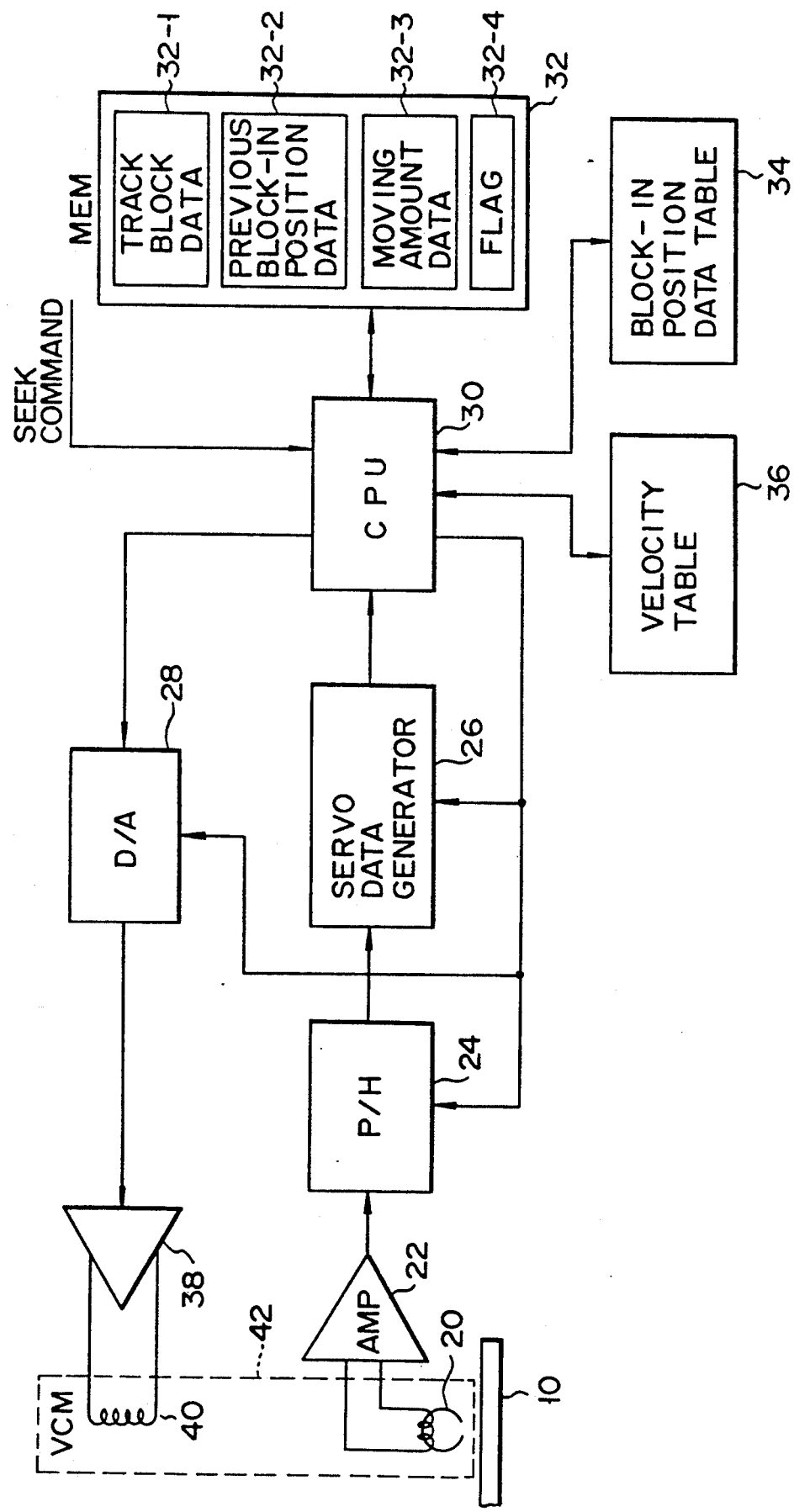
FIG. 2 is a block diagram showing an arrangement of an access controller according to an embodiment of the present invention.

Referring to FIG. 2, an access mechanism 42 includes a magnetic head 20 and a voice coil motor (VCM) 40. A recording medium (magnetic disk) 10 is rotationally driven by a spindle motor (not shown). A driver 38 drives the VCM 40 in response to an input velocity signal, and as a result, the magnetic head 20 is radially moved on the recording medium 10. A servo signal corresponding to a servo pattern read out from the disk 10 by the stopped or moving head 20 is amplified by an amplifier 22, and the amplified servo signal is supplied to a peak hold circuit (P/H) 24. The P/H circuit 24 holds a peak value of the servo signal, in response to a timing control signal from a microprocessor (CPU) 30, this value then being supplied to a servo data generator 26. In response to a timing control signal from the CPU 30, the generator 26 generates servo data in accordance with the peak value supplied thereto by the P/H 24, and outputs the servo data to the CPU.

The CPU 30 generates various control signals, and outputs them to the P/H 24, the generator 26, and a D/A converter 28. The CPU 30 also refers to a block-in position data table 34, in accordance with the servo data from the generator 26. The table 34 stores blockin track position data associated with the servo data shown in FIG. 1B, and also stores error data associated with servo data of combinations other than those shown in FIG. 1B. Whether the servo data is correct or not is determined by CPU 30 in accordance with the data read out from the table 34.

A memory 32 includes a register 32-1 for storing track block data, a register 32-2 for storing previous block-in position data, a register 32-3 for storing moving amount data, and a register 32-4 in which a flag is set. When the CPU 30 receives a seek command, a flag representing a dynamic mode is set in the register 32-4, and when a destination track is sought, the flag of the register 32-4 is reset, i.e., a static mode is set.

When it is determined by the CPU 30 that the servo data is correct, the data read out from the table 34 serves as block-in position data, while when it is determined that the servo data is not correct, it is determined that an error has occurred upon generation of the servo data, with the result that error processing is executed. In the error processing, it is checked in accordance with the value of the register 32-4 whether the static mode or the dynamic mode is set. When it is determined that the static mode is set, previous block-in position data stored in the register 32-2 is determined to be current block-in position data. When it is determined that the dynamic mode is set, the sum of the previous block-in position data and moving amount data is determined to be the current block-in position data.

The CPU 30 determines whether the head 20 has been moved into a new block from the determined current block-in position data. When it is determined that the head 20 has been moved into a new inner block, the content of the register 32-1 is incremented by "1", while when it is determined that the head 20 has been moved into a new outer block, the content is decremented by "1". When it is determined that the head 20 has not been moved into the new block, the content of the register 32-1 is not updated.

Position data representing the position of the head on the disk 10 is determined from the determined current block-in position data and the track block data stored in the register 32-1. Thereafter, the moving amount data is determined from the determined current block-in position data and the previous block-in position data stored in the register 32-2, and written in the register 32-3.

In a dynamic mode, the CPU 30 refers to a velocity table 36 in accordance with the determined position data, and obtains velocity data. The obtained velocity data is output to the D/A converter 28 and converted into an analog velocity signal. The driver 38 drives the VCM 40 in the access mechanism 42 in accordance with the velocity signal.

Figure 3:
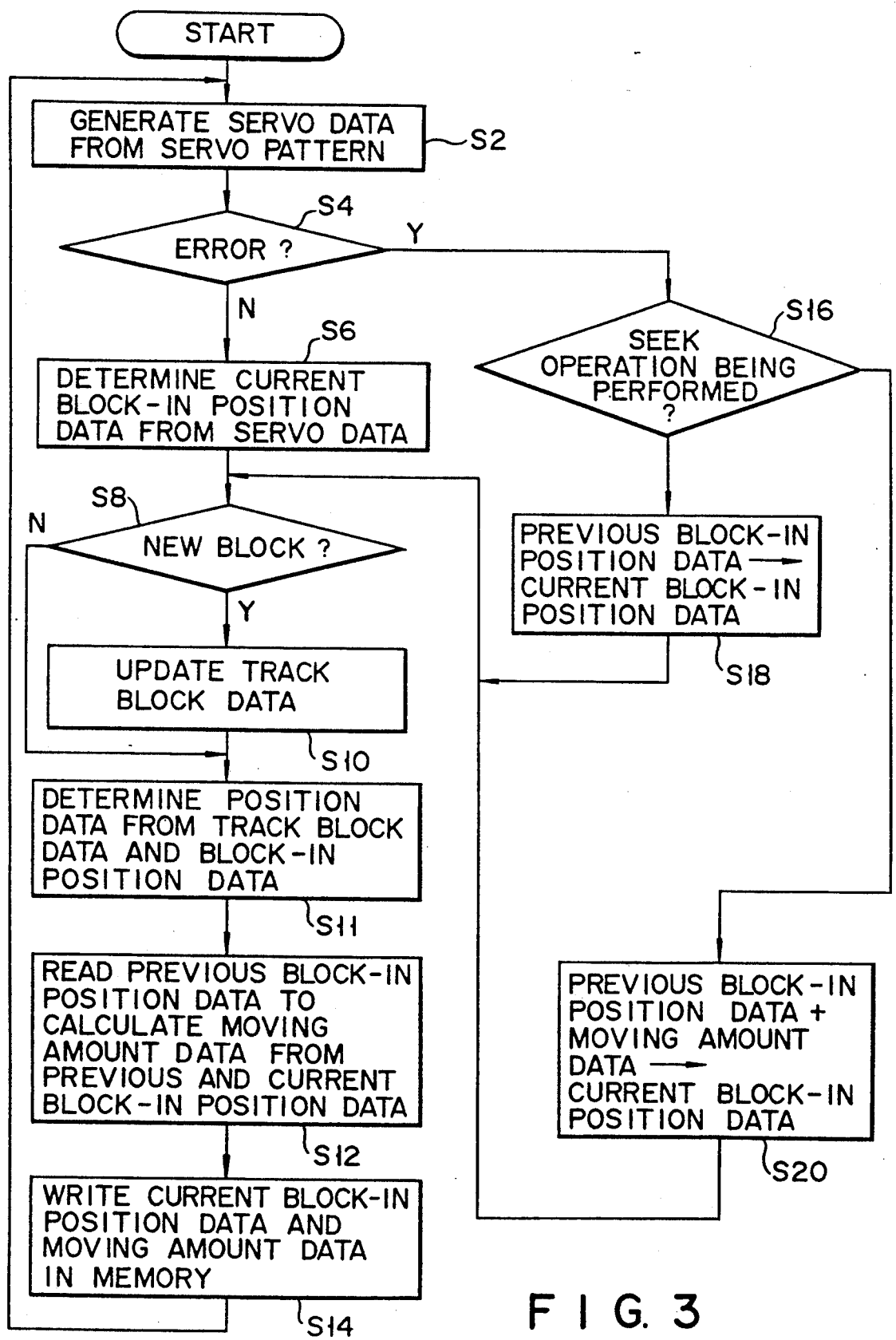
FIG. 3 is a flow chart for explaining the operation of the access controller according to the embodiment.

An operation of the access controller according to the present invention will be described hereinafter with reference to FIG. 3.

Assume that a seek command is not input to the CPU 30. In other words, a flag is not set in the register 32-4, and a static mode is set.

The disk 10 is rotated and driven by the spindle motor. The servo patterns shown in FIG. 1A are recorded in the disk 10. In step S2, a servo signal corresponding to a servo pattern read out from the recording medium 10 by the head 20 is amplified by the amplifier 22. The amplified servo signal is supplied to the P/H circuit 24. The P/H circuit 24 holds the peak value of the servo signal in response to a timing control signal from the CPU 30. The held peak value is supplied to the servo data generator 26. The generator 26 generates servo data from the peak value of the P/H 24 in response to a timing control signal from the CPU 30.

In step S4, the CPU 30 refers to the table 34 in accordance with the servo data from the generator 26. It is determined whether the servo data is correct or not in accordance with the data read out from the table 34. When it is determined in step S6 that the servo data is correct, i.e., when N is obtained in step S6, the data read out from the table 34 is determined to be current block-in position data. Thereafter step S8 is performed. When it is determined that the servo data is not correct, i.e., when Y is obtained in step S6, it is determined that an error occurs upon generation of the servo data, and error processing is executed in step S16.

In step S8, it is determined whether the head 20 has been moved into a new block in accordance with the determined current block-in position data. When it is determined that the head has been moved into the new block, the content of the register 32-1 is incremented or decremented by "1"in step S10. When it is determined that the head 20 has not been moved into the new block, step S11 is directly executed, and the content of the register 32-1 is not updated. In step S11, position data is determined from the current block-in position data and the track block data.

In step S12, previous block-in position data is read out, and the moving amount data is calculated from the current and previous block-in position data. In step S14, the calculated moving amount data is written in the register 32-3, and the current block-in position data is written in the register 32-2 as previous block-in position data. Thereafter, the flow returns to step S2.

When it is determined in step S4 that an error occurs, and it is determined from the content of the register 32-4 in step S16 that a static mode is set, the previous block-in position data is determined to be the current block-in position data in step S18. Thereafter, step S8 is executed.

When a seek command is input, a flag is set in the register 32-4, and a dynamic mode is set. When in the dynamic mode, it is determined in step S4 that no error has occurred, step S6 and following are executed in the same manner as in the static mode. When it is determined in step S4 that an error has occurred, and it is determined in step S16 that a dynamic mode is set, step S20 is executed. In step S20, the current block-in position data is determined from the previous block-in position data and moving amount data. Thereafter, step S8 is executed. When it is estimated from the current block-in position data that the head 20 has been moved into a new block, step S10 is executed. The operations from step S11 are then executed.

What is claimed is:

1. An apparatus for determining a track position of a head on a recording medium including a plurality of track blocks, each of which includes a plurality of tracks, comprising:

generating means for reading out servo patterns recorded on said recording medium, and for generating servo data from the read out servo patterns;

storage means for storing previous block-in position data and movement amount data, the previous block-in position data representing a previous track position of said head in tracks included in a current track block of the track blocks, and the movement amount data representing a number of tracks between the previous track position and a track position previous to the previous track position;

determination means for selectively determining current block-in position data from at least one of the servo data, the previous block-in position data and movement amount data, the current block-in position data representing a current track position of said head; and calculating means for calculating a difference between the previous and current block-in position data and writing the difference as the movement amount data into said storage means.

2. An apparatus according to claim 1, wherein said determination means includes servo data checking means for checking whether or not the servo data is correct.

3. An apparatus according to claim 2, wherein said servo data checking means includes table means for storing block-in position data and error data, and checking means for referring to said table means in accordance with the servo data to obtain one of the block-in position data and the error data, and for determining that the servo data is correct when the block-in position data is obtained from said table means and that the servo data is not correct when the error data is obtained.

4. An apparatus according to claim 3, wherein said determination means includes means for determining the block-in position data as the current block-in position data when it is determined that the servo data is correct.

5. An apparatus according to claim 2, wherein said determination means includes means for determining the current block-in position data from the servo data when it is determined that the servo data is correct.

6. An apparatus according to claim 2, wherein said determination means includes means for determining the previous block-in position data as the current block-in position data when it is determined that the servo data is not correct and said head is static on the current track position.

7. An apparatus according to claim 2, wherein said determination means includes means for determining the current block-in position data from a sum of the previous block-in position data and the movement amount data when it is determined that the servo data is not correct and said head is in a dynamic mode.

8. An apparatus according to claim 1, wherein said storage means includes means for storing track block data representing a current track block position of said head, and said determination means further comprises determining means for determining current position data of said head from the track block data and the current block-in position data to control a moving speed of said head.

9. An apparatus according to claim 8, wherein said determination means further comprises updating means for updating the track block data when the current track position represented by the current block-in position data is outside the current track block.

10. A method of determining a track position of a head on a recording medium including a plurality of track blocks, each of which includes a plurality of tracks, comprising:

generating servo data from the servo patterns recorded on the recording medium;

selectively determining current block-in position data from at least one of the servo data, previous block-in position data and movement amount data, the previous block-in position data representing a previous track position of said head in tracks included in a current track block of the track blocks, the movement amount data representing a number of tracks between the previous track position and a track position previous to the previous track position, and the current block-in position data representing a current track position of said head; and calculating a difference between the previous and current block-in position data, and using data representing the difference as the movement amount data.

11. A method according to claim 13, wherein said determination step includes checking whether or not the servo data is correct.

12. A method according to claim 11, wherein said checking step includes referring to a table, for storing block-in position data and error data, in accordance with the servo data to obtain one of the block-in position data and the error data, and determining that the servo data is correct when the block-in position data is obtained from the table and that the servo data is not correct when the error data is obtained.

13. A method according to claim 12, wherein said determination step includes determining the block-in position data as the current block-in position data when it is determined that the servo data is correct.

14. A method according to claim 11, wherein said determination step includes determining the current block-in position data from the servo data when it is determined that the servo data is correct.

15. A method according to claim 11, wherein said determination step includes determining the previous block-in position data as the current block-in position data when it is determined that the servo data is not correct and said head is static on the current track position.

16. A method according to claim 11, wherein said determination step includes determining the current block-in position data from a sum of the previous block-in position data and the movement amount data when it is determined that the servo data is not correct and said head is in a dynamic mode.

17. A method according to claim 10, wherein said determination step further comprises determining current position data of said head from track block data and the current block-in position data to control a moving speed of the head, the track block data representing a current track block position of said head.

18. A method according to claim 17, wherein said determination step further comprises updating the track block data when the current track position represented by the current block-in position data is outside the current track block.

* * * * *